United States Patent [19]
Enokian

[11] Patent Number: 4,662,635
[45] Date of Patent: May 5, 1987

[54] VIDEO GAME WITH PLAYBACK OF LIVE EVENTS

[76] Inventor: Craig Enokian, 7455 W. 125 St., Palos Heights, Ill. 60463

[21] Appl. No.: 866,529

[22] Filed: May 23, 1986

Related U.S. Application Data

[63] Continuation of Ser. No. 682,730, Dec. 16, 1984, abandoned, which is a continuation-in-part of Ser. No. 604,332, Apr. 24, 1984, abandoned, which is a continuation of Ser. No. 239,843, Mar. 2, 1981, abandoned.

[51] Int. Cl.⁴ .......................... A63F 7/06; A63F 9/22
[52] U.S. Cl. ............................. 273/94; 273/DIG. 28; 273/85 G
[58] Field of Search ................ 273/1 E, 85 G, 138 A, 273/94, DIG. 28; 434/307, 323, 20, 43; 340/721, 725, 705; 358/104, 142, 91, 92

[56] References Cited

U.S. PATENT DOCUMENTS

| | | | |
|---|---|---|---|
| 3,563,547 | 2/1971 | Marsh | 273/94 R |
| 3,807,734 | 4/1974 | Lowther | 273/94 R |
| 3,973,773 | 8/1976 | Glass et al. | 273/94 R |
| 3,987,484 | 10/1976 | Bosche et al. | 434/307 |
| 4,003,580 | 1/1977 | Haffey | 273/94 R X |
| 4,082,437 | 4/1978 | Williams | 273/94 R X |
| 4,093,223 | 6/1978 | Wilke et al. | 273/DIG. 28 X |
| 4,173,346 | 11/1979 | Godwin | 273/94 R |
| 4,304,404 | 12/1981 | Pundt | 273/94 R |
| 4,357,014 | 11/1982 | Baer et al. | 273/94 R |
| 4,445,187 | 4/1984 | Best | 434/323 |

*Primary Examiner*—Richard C. Pinkham
*Assistant Examiner*—MaryAnn Stoll Lastova
*Attorney, Agent, or Firm*—Ernest Kettelson

[57] ABSTRACT

A video game in which a television screen or cathode ray tube is used to display a variety of plays previously preformed by living beings and recorded at the time on a video recording medium, such as video tape or video disks, the particular previously performed play which is displayed during each turn, or each play of the video game in accordance with this invention depending on the number, or combination or numbers, selected by one or more players, such number corresponding to one of the previously performed and recorded plays. The number selected is fed into an electronic control console, which includes circuitry to signal an electronic playback unit in which the previously performed and recorded plays have been stored to re-run the particular play corresponding to the number selected through a pick-up circuit connected to the cathode ray tube or television screen. Plays of a variety of games, including football, baseball, soccer, hockey, basketball, tennis and the like may be recorded to play any of such games in accordance with this invention. The invention includes a record keeping system to record the progress, if any, of each player towards a score or goal indicated by the particular play selected and displayed during each player's turn.

2 Claims, 6 Drawing Figures

VIDEO GAME WITH PLAYBACK OF LIVE EVENTS

PRIOR APPLICATIONS

This is a continuation of application Ser. No. 682,730, filed Dec. 16, 1984, now abandoned which is a continuation-in-part of application Ser. No. 604,332, filed Apr. 24, 1984, now abandoned, which in turn is a continuation of application Ser. No. 239,843, now abandoned, filed Mar. 2, 1981.

BACKGROUND OF THE INVENTION

This invention relates to the field of video games in which plays are fed into an electronic device and displayed electronically.

A number of games of this type have been developed and marketed in recent years. However, they have used and displayed simulated actors, playing pieces and the like rather than real human beings making the actual plays of the particular game involved, and even other living beings such as horses and dogs in the case of games corresponding to horse and dog races, and the like. The present invention utilizes real live actors or players, making actual plays of the game in question, which have been recorded on video tape, or video disks, or other video recording medium. It is therefore a substantial and novel improvement over previously known video games.

OBJECT OF THE INVENTION

It is an object of the invention to provide a video game in which previously recorded plays by real living beings are used and displayed on a television screen or other cathode ray tube in accordance with selections made by each player of the video game.

It is an object of the invention to provide a video game having a cathode ray tube on which to display each play of the game, an electronic storage and play-back unit in which pictures of previously performed plays are stored for playback upon receipt of an identifying signal, and means to feed such identifying signals to said storage and playback unit as and when selected by each player of the video game.

It is an object of the invention to provide a video game in which actual plays or performances of living beings are displayed on a cathode ray tube in accordance with plays selected by players of the video game, including record keeping apparatus to record the progress of each player toward a goal or score as indicated by each play selected.

DESCRIPTION OF PREFERRED EMBODIMENT

Figure 1:
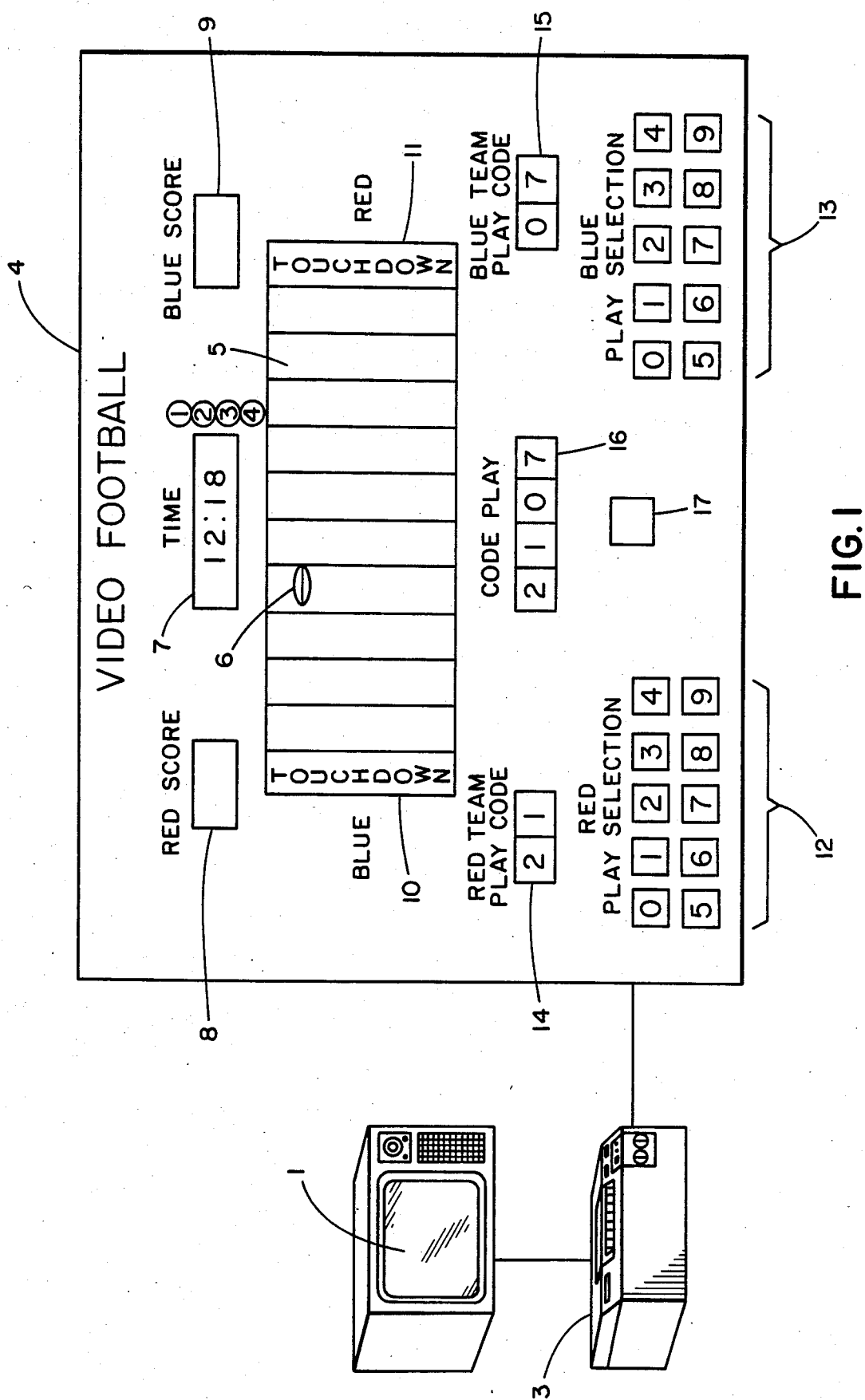
FIG. 1 is a perspective view of a television screen, a video recorder and play back unit, and a game control console in accordance with this invention.
Figure 2:
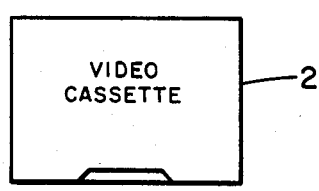
FIG. 2 is a plan view of a video cassette used in accordance with this invention.
Figure 3:
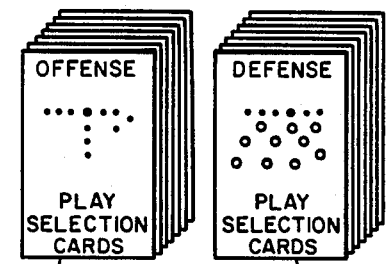
FIG. 3 is a plan view of two sets of play designation cards for use in accordance with this invention.

The video game in accordance with this invention comprises a television screen or cathode ray tube 1, one or more video cassettes 2 or other medium on which to record visual representations of a variety of plays of games such as football, baseball and the like performed by living players, a play-back unit or combination video recorder and play-back unit 3, and a game control console 4 by which players select the plays and record their progress.

It will be understood that many types of athletic contests and games may be made the subject of the video game in accordance with this invention, including football, baseball, hockey, basketball, soccer, tennis, volleyball, badminton, cricket, and the like, the primary requirement being that the game has at least two opposing sides, and that each side has one or more players. All conceivable plays in each game, or a selected number of the more common plays, are recorded on video tape, video disk, or other medium which records for later play-back visual performances by living beings. During play of the video game in accordance with this invention, one player on one side selects a play for playback and a second player on the opposing side selects a play designed to counter the play he believes the first player selected. The plays of both the first and second player may be identified by numbers, and the combination of both numbers may serve to identify the previously recorded play which will be played back and displayed on the cathode ray tube or television screen 1. The play will include the action selected by the first player for his side (e.g. offense) and the counteraction selected by the second player for his side (e.g. defense). If the second player managed to select the right defensive play and it is executed properly, the offense would not make any progress or score. If he selected the wrong defensive play or maneuver, the combination of numbers would signal the play-back unit 3 to play back the offensive play selected by the first player with the ineffective and wrong defense picked by player number two; which would result in a gain or score being displayed on the cathode ray tube or television 1.

With this general description as a backdrop, the particular game of football will now be described in detail as played in the video game in accordance with this invention.

For the game of football, the game control console 4 may be as shown in FIG. 1, including a plan view of a football field 5 having vertical lines representing ten yard markers across the field, starting from the left with a 10 yard marker, then 20 yards, 30 yards, 40 yards, 50 yards, 40 yards, 30 yards, 20 yards, 10 yards. End zones are shown at each opposite end of the field 5 by the words "TOUCHDOWN". A football 6 is provided for movement and placement in accordance with the plays which are selected, played-back and displayed on the television screen 1.

A time clock 7 is provided on the game control console 4, which is set for the number of minutes in each quarter such as 15 minutes. The game continues until time runs out for each quarter, the clock 7 is re-set for the next quarter, and so on until four quarters have been played at which time the game terminates.

Figure 4:
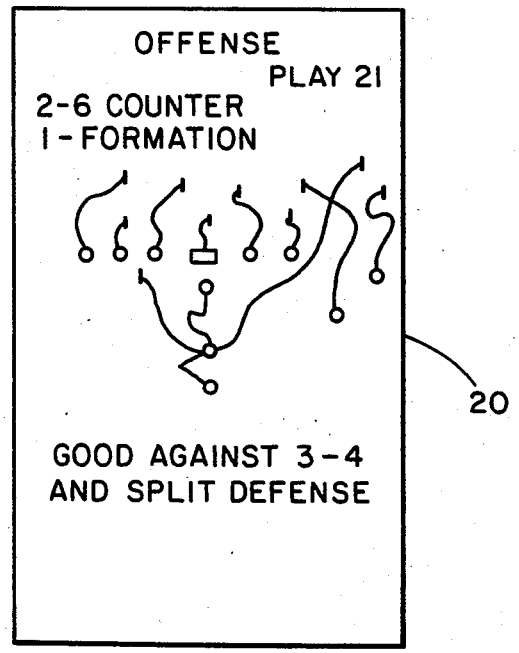
FIG. 4 is a plan view of a card illustrating and identifying one play for the offense which is representative of other cards in the set which illustrate and identify a variety of other offensive plays.
Figure 5:
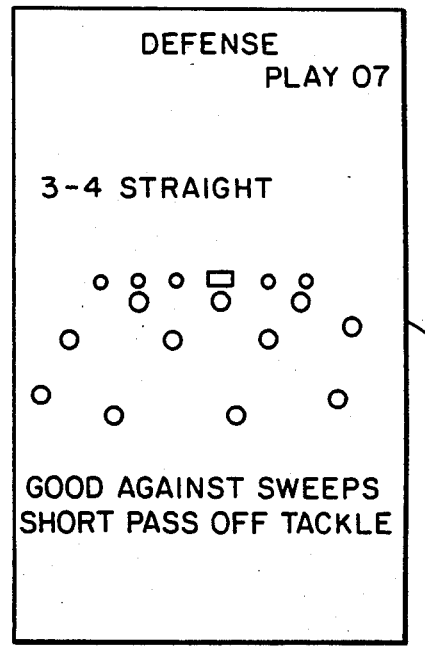
FIG. 5 is a plan view of a card illustrating and identifying one play for the defense which is representative of other cards in the set which illustrate and identify a variety of other defensive plays.

The game control console 4 includes a scoreboard or score-keeping means, including a panel 8 as shown in FIG. 4 which shows the score of the RED team and a panel 9 which shows the score of the BLUE team. When the RED team moves the football in the end zone 10 guarded by the BLUE team for a touchdown, the panel 8 of the RED team registers 6 points. If the next play selected results in play-back of a successful point-after-touchdown kick, by the RED team, an additional point is shown in scoring panel 8 for the RED team. In the same fashion, when the BLUE team reaches the end zone 11 guarded by the RED team by touchdown, point-after, field goal, or safety the corresponding score appears in scoring display panel 9 for the BLUE team.

Plays are selected as follows. As shown in FIG. 1, the game control console 4 includes two sets of "PLAY SELECTION" push buttons 12 and 13 in the lower left and right corners of the control console 4. The set shown in the lower left corner are designated RED and those in the lower right corner are designated BLUE. Each set includes ten pushbuttons representing respectively the numbers "0", "1", "2", "3", "4", "5", "6", "7", "8", and "9". From this combination of numbers, each player can select up to 99 plays (or actually 100 plays if zeroes are assigned to one of the plays), by pressing one or two of the pushbuttons in his PLAY SELECTION set. The one or two digit number selected by the player representing the RED team will appear in a PLAY CODE display panel 14. The one or two digit number selected by the player representing the BLUE team will appear in a PLAY CODE display panel 15. Single digit selections will include the number "0" to the left of the single digit number selected. When both players have made their selections for both RED and BLUE teams, the numbers appearing in the respective PLAY CODE display panels 14 and 15 are combined in the four digit display panel 16 identified in FIG. 4 by the words CODE PLAY. The two digits from PLAY CODE display panel 14 appear in the two digit display panels to the left in the four digit CODE PLAY display panel 16, and the two digits from PLAY CODE display panel 15 appear in the two digit display panels to the right in the four digit CODE PLAY display panel 16. For example, if RED TEAM selected the two digit number "21" and BLUE TEAM the two digit number "07," the number appearing in CODE PLAY display panel 16 would be "2107."

After the players have made their play selections and a number appears in the CODE PLAY display panel 16, push-button switch 17 is depressed to signal the play-back unit 3 to fast search for the play identified on the video tape, or disk, or other recording medium by the number showing in CODE PLAY display panel 16, and when reached to run that particular play on the play-back unit 3 sending the video signals to the television screen 1, or other cathode ray tube, or other visual display means.

The timing, scoring and play selection operations described above may be electronically operated and controlled by an electronic game control panel 4, as described in detail herein below. However, the timing, scoring and play selection operations may be performed mechanically, or even manually up to the point of entering a number in the four digit CODE PLAY display panel 16. At this point, an electronic circuit is provided to identify and sense the number entered therein, and to feed a corresponding signal to the play-back unit 3 having a fast-search circuit therein as well known in the art to rapidly move the video tape (or other video recording medium) to that portion which corresponds to the signal received for play back, as is also well known in the art.

It is apparent that a very large number of plays can be provided for, including all possible plays and variations thereof, of football or any other desired game. It would of course be expensive to take video pictures and record on video tape (or other medium) of all conceivable plays by living players, and to hire living players to perform all of such plays. It is possible and within the scope of this invention to limit the number of plays to those which are most basic, and elaborate thereafter depending on the desire of those who wish to purchase and play video games of this type in accordance with this invention. A video cassette 2 having a limited number of plays would of course be less expensive than one having many plays, but the other game components including the television screen 1, the play-back unit 3, and the game control console 4 can be used with minimum cost-minimum play cassettes or with the most expensive-complete play cassettes.

The video game in accordance with this invention may include two sets of play designation cards 18 and 19, one set 18 for the RED TEAM and the other set 19 for the BLUE TEAM. The cards may have shown thereon particular offensive play or defensive play with a two digit number which identifies that particular play. If the player desires to use that play, he enters its corresponding number in the PLAY CODE display panel 14 or 15 of game control console 4, and that play will then be run opposite whatever play the opposing player selects, both plays being identified by the combined four digit number which appears in CODE PLAY display panel 16 after both players have made their selections. The signal for such play is fed to play-back unit 3, and such play is then re-run and shown on the television screen 1, after which the football 6 is moved in accordance with the outcome of such play as shown on the television screen.

The cards 18 and 19 may be as elaborate or as basic as the number of plays recorded on the video cassette 2 or other video recording medium. It is unnecessary here to describe all of the possible plays and variations thereof in the game of football, and of other games, but two cards 20 and 21 will be described in detail to illustrate their function.

Assume that the RED team is on offense and the BLUE team on defense. Card 20 illustrates a play for the offense identified by the number "21," which may be called a 2-6 Counter I Formation, showing the positions of the offensive players and stating that such offensive play is good against the 3-4 and split defense. Card 21 illustrates a play for the defense identified by the number "07," which may be called a 3-4 straight defense. The positions of the defensive players are shown together with the positions of six offensive linemen. The card explains that such defensive play is good against sweeps, and short passes off tackle. Thus, by use of the sets of cards 18 and 19, players who are not professionally knowledgeable about the game of football (or other game) can make intelligent choices.

If the player having the RED team on offense chooses the offensive play described on card 20, he depresses the numbers of the play shown on the card, namely "21" on the PLAY SELECTION keyboard 12 for the RED team. The number "21" then shows up in the two digit display panel 14 identified as RED TEAM PLAY CODE on the game control console 4.

If the player having the BLUE team on defense chooses the defensive play described on card 21, he depresses the numbers of the play shown on the card, namely "07" on the PLAY SELECTION keyboard 13 for the BLUE team. The number "07" then shows up in the two digit display panel 15 identified on BLUE TEAM PLAY CODE on the game control console 4.

The combined number "2107" then appears in the four digit CODE PLAY display panel 16. The pushbutton 17 is depressed, and an electronic signal is fed to play-back unit 3 as described above, to fast-search for the play corresponding to the number "2107," and re-run that play on the TV screen 1. The outcome of that play is then recorded by moving the football 6 accordingly on the football field 5 of game control console, and recording any points if a touchdown or other scoring play resulted.

More than one video cassette 2 may be used in playing the game. For example, one video cassette 2 may include kickoff and return, plus punts and punt-return plays, while a second cassette 2 may include action plays during first, second, third and fourth downs, using the game of football as an example.

The play designation cards 18 and 19 may be subdivided into additional groups besides offense and defense which have been described above. Additional groups of cards may include one group for kick-off and return plays while another group describes and identifies punt and punt-return plays. For example, the play designation cards may include 30 cards identifying thirty offensive plays, 10 cards identifying ten defensive plays, 10 cards identifying ten kick-off and return plays and 15 cards identifying fifteen punt and punt-return plays.

After the same cassettes have been used a number of times, the players may begin to remember the results obtained from each number selected. To overcome this problem, a variety of cassettes may be used in which the same plays have been pre-recorded with the same identifying numbers but with different results, and the particular cassette used for each turn or for each play being chosen by chance or by lot, such as be spinning a wheel, throwing of dice, picking a card, and the like. In this way, no player would be able to memorize the outcome of any particular play combination.

The elctronic circuitry and components to perform the foregoing operations are as follows.

Figure 6:
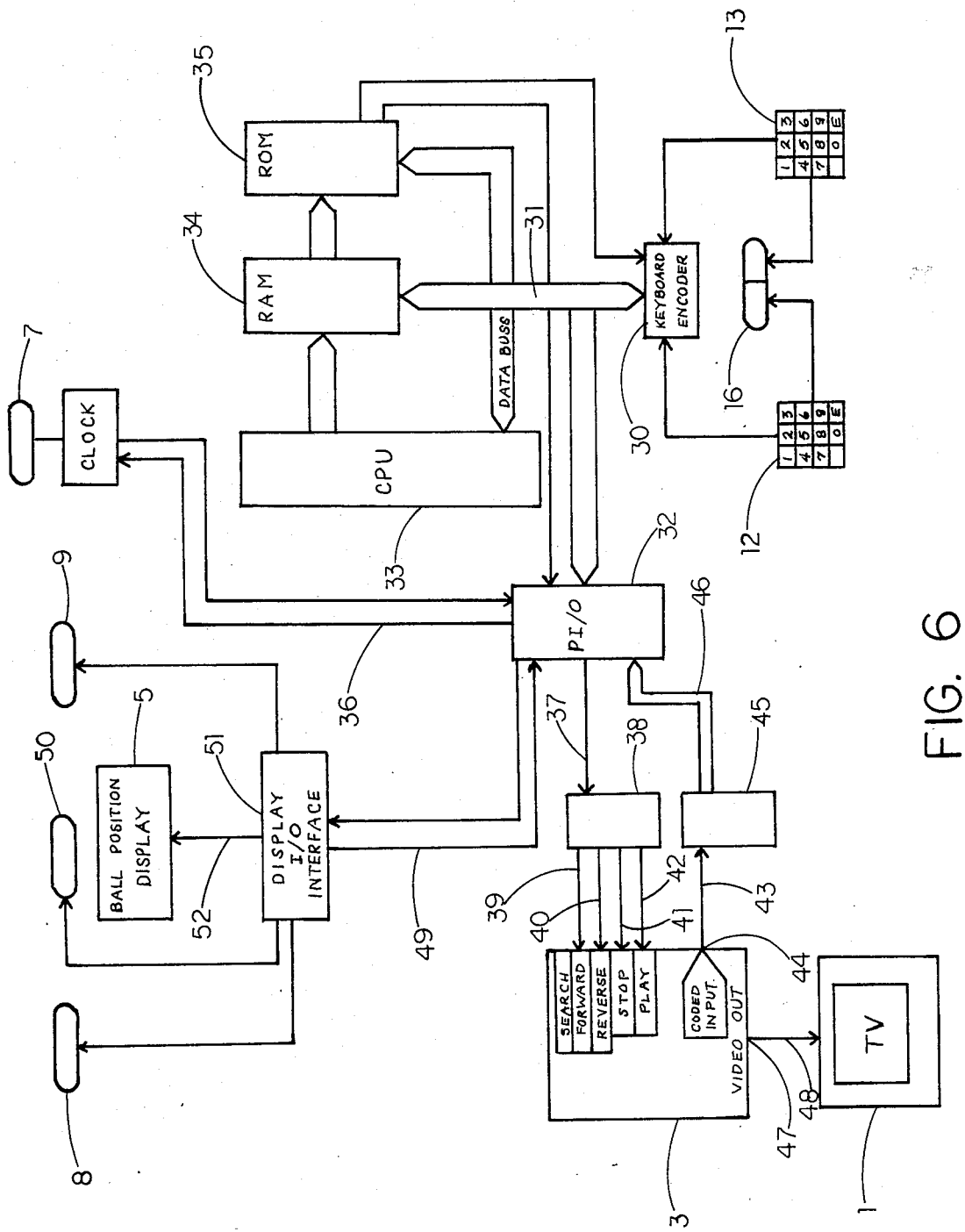
FIG. 6 is a schematic of a basic logic circuit illustrating a circuit for operating the video game in accordance with this invention.

FIG. 6 illustrates a basic logic circuit showing the play selection push buttons 12 for the RED team and play selection buttons 13 for the BLUE team connected in an electronic circuit to the four digit display panel 16 and to a keyboard encoder component 30. A data bus 31 leads from the keyboard encoder 30 to a parallel input-output component 32 as well as to a central processing unit 33, a RAM (random access memory) component 34, and an ROM (read only memory) component 35.

The clock display 7 is connected by way of a timing circuit 36 to the parallel input-output component 32 to time and indicate the number of minutes remaining in each quarter of the football game.

The video recorder and play back unit 3 is connected to the parallel input-output component 32 by way of conductor 37 leading to a control input-output component 38 having four output terminals 39, 40, 41 and 42. Output terminal 39 is connected to the forward search circuit of the video recorder-playback unit 3, output terminal 40 to its reverse circuit, output terminal 41 to stop or interrupt the forward-reverse circuit, and output terminal 42 to start or close the play or operating circuit of the video recorder-playback unit 3.

The circuit between the video recorder and play back unit 3 and the parallel input-output component 32 is completed by a conductor 43 leading from a play description output terminal 44 of the video recorder and playback unit 3 to a serial to parallel component 45, from which a bus bar 46 leads back to the parallel input-output component 32 as described in more detail below.

The operating outlet terminal 47 of the video recorder and playback unit 3 is connected by way of a cable 48 to the television set or cathode ray tube 1 to display thereon the video signals received from the video recorder and playback unit 3 representing the football play corresponding to the four digit number shown on the four digit display panel 16 and fed into the central processing unit 33 and parallel input-output component 32 which tells the video recorder-playback unit 3 what play to search for on the video cassette inserted therein and play back on the television screen 1.

Besides the output to the television screen 1, the output signals from the same play being transmitted over the cable 48 to the television set are being transmitted from terminal 44 over the conductor 43 to the serial to parallel component 45 which processes that portion of the signal showing where the football is moved to during the particular play being transmitted, as well as any information regarding the score if any score resulted from the play, and the particular down that is coming up. That electronic signal information is carried by the bus bar 46 to the parallel input-output component 32 which feeds such signal information to a ball position, down and score information circuit 49 leading to that part of the circuitry which processes and displays this information, the ball position being displayed on a lighted panel representing the football field 5, the score information being displayed digitally on display panels representing the RED team score 8 and BLUE team score 9, the down information being displayed digitally on a display panel 50.

The circuitry for processing the information as to ball position, down and score includes a display input-output interface component 51 connected to the ball position, down and score information circuit 49, which separates the respective signals and sends the ball position signal over conductor 52 to the lighted football field display 5, the down information signal over conductor 53 to the down display panel 50, the RED team score information signal over conductor 54 to the RED team score display panel 8, and the BLUE team score information signal over conductor 55 to the BLUE team score display panel 9.

In operation, each player enters a two digit number in the circuit by pressing two of the buttons on their respective play selection push buttons 12 and 13. A combined four digit number then appears in the four digit display panel 16. The signal representing such four digit number is then sent over the data bus 31 to the central processing unit 33, the RAM 34, and the ROM 35. The ROM 35 then signals the central processing unit 33 to locate the four digit number signal which has been selected, which in turn transmits such signal to the parallel input-output component 32. That component controls the forward, reverse, stop and play modes of the video recorder and playback unit 3, through the control input-output component 38, which as described above locates the particular play on the cassette (wherein each play has previously been given a corresponding four digit code) and plays it back on the cathode ray tube 1.

The RAM 34 receives information from the central processing unit 33 as to plays selected, where the football ends up after completion of each play and how far it should be moved forward or backward after each play, what down it was before and is now, and any other interim rsults that occur as a result of each play, and provides a comparison of selected plays to operational rules of the game contained in the ROM 35. That information is transmitted as described above from the parallel input-output component 32 over the ball position, down and score information circuit 49 to the input-output interface component 51 for separation and distribution of the signal information as follows, to the football field display 5 showing where the football has been moved to, to the down display panel 50 to show what the next down will be, and to the score display panels 8 (for RED) and 9 (for BLUE) to show what change if any there is in the score as a result of the last play.

I claim:

1. A video game, comprising video recording means for visual reproduction and eventual play-back of a plurality of separable action events performed by living beings which remain as originally recorded when played back, said separable action events having a starting point, a running time, and an ending point, video play-back means to visually display respective ones of such separable action events from its starting point to its ending point when played back, an electronic circuit to operatively connect said video recording means to said video play-back means, first play selection means for a first player, second play selection means for a second player, a central processing unit connected in said circuit to said first and second play selection means to receive combined play selection signals therefrom, identification means on said video recording means which separately identifies each of said separable action events previously recorded thereon for playback as recorded, said identification means for each of said separable action events identifying only one specific one of said prerecorded action events, said combined play selection signals corresponding respectively with individual ones of said identification means which separately identifies each of said separable action events, a random access memory component (RAM) connected in said circuit to said central processing unit which receives electronic signals from said RAM as to events occurring during a play operation and compares with preselected game information stored in a read only memory component (ROM) and feeds to a parallel input-output component for transmittal to information display means, including said read only memory component (ROM), said parallel input-output component, and said information display means, said parallel input-output component being connected in said circuit to said central processing unit to receive said play selection signal therefrom, video play-back means to play back said video recording means, said video play-back means having a forward search circuit, a reverse search circuit, circuit interruption means to stop said forward and reverse circuits, and an operating video circuit responsive to said search circuits to move said video recording means when received on said video play-back means to the said starting point of a respective one of said separable action events upon receipt of a corresponding combined play selection signal from said central processing unit and to thereupon play back said one of said separable action events from its said starting point to its said ending point, a cathode ray tube connected to said operating video circuit of said video play-back means to visually display the signals transmitted from said portion of said video recording means located by said search circuits.

2. A video game as set forth in claim 1, including a first conductor connected between said parallel input-output component and said forward search circuit of said video play-back means to carry a signal from said central processing unit to instruct said video play-back means to move said video recording means forward, a second conductor connected between said parallel input-output component and said reverse circuit of said video play-back means to carry a signal from said central processing unit to instruct said video play-back means to move said video recording means in reverse, a third conductor connected between said parallel input-output component and said circuit interruption means of said video play-back means to carry a signal from said central processing unit to instruct said video play-back means to stop said video recording means received thereon at a particular location thereof corresponding to said combined electronic play selection signal, and a fourth conductor connected between said parallel input-output component and said operating video circuit of said video play-back means to carry a signal from said central processing unit to instruct said video playback means to run the portion of said video recording means so located and transmit the video signals therefrom to said cathode ray tube, including a video cable connected between said video play-back means and said cathode ray tube over which said video signals are transmitted.

* * * * *